United States Patent [19]

Fermann

[11] Patent Number: 5,440,573

[45] Date of Patent: Aug. 8, 1995

[54] METHOD AND APPARATUS FOR CONTROLLING LASER EMMISION WAVELENGTH USING NON-LINEAR EFFECTS

[75] Inventor: Martin E. Fermann, Ann Arbor, Mich.

[73] Assignee: IMRA America, Inc., Ann Arbor, Mich.

[21] Appl. No.: 215,579

[22] Filed: Mar. 22, 1994

[51] Int. Cl.⁶ .......................................... H01S 3/098
[52] U.S. Cl. ...................................... 372/18; 372/29; 372/27; 372/11; 372/6
[58] Field of Search ...................... 372/18, 20, 6.27, 6, 372/11, 29

[56] References Cited

PUBLICATIONS

M. E. Fermann et al., "Additive–pulse–compression mode locking of a neodymium fiber laser", *Optics Letters*, vol. 16, No. 4, Feb. 15, 1991, pp. 244–246.
M. E. Fermann et al., "Environmentally stable Kerr–type mode–locked erbium fiber laser producing 360–fs pulses", *Optics Letters*, vol. 19, No. 1, Jan. 1, 1994, pp. 1–4.
I. N. Duling, III, et al., "Single–Polarisation Fibre Amplifier", *Electronics Letters*, vol. 28, No. 12, Jun. 4, 1992.
T. Brabec et al, "Mode locking in solitary lasers", *Optics Letters*, vol. 16, No. 24, Dec. 15, 1991, pp. 1961–1963.
S. M. J. Kelly, Laser Theory Group, Blackett Laboratory, U.K., "Characteristic sideband instability of the periodically amplified average soliton", pp. 1–7 and drawings (1992).

*Primary Examiner*—Leon Scott, Jr.
*Attorney, Agent, or Firm*—Burns, Doane, Swecker & Mathis

[57] ABSTRACT

The present invention is generally directed to a laser, such as a soliton fiber laser, having an emission wavelength controlled by non-linear effects. Although the emission wavelength of such lasers is typically limited to the center of the gain profile, exemplary embodiments of the present invention provide relatively broad bandwidth control by producing significant gain-pulling using non-linear effects. Any non-linear effects in a laser cavity can be used to provide significant gain pulling and a broadband wavelength tuning range including, for example, the soliton self-frequency shift (SSFS) and cross-phase modulation (CPM). As a result, non-linear tuning can be achieved. Exemplary embodiments provide gain-pulling which allows a significant separation to be induced between the peak emission wavelength of the modelocked fiber laser (i.e., the modelocked emission wavelength, or MLEW) and the emission wavelength of the non-modelocked laser (i.e., the continuous wave emission wavelength, or CWEW).

24 Claims, 3 Drawing Sheets

METHOD AND APPARATUS FOR CONTROLLING LASER EMMISION WAVELENGTH USING NON-LINEAR EFFECTS

BACKGROUND OF THE INVENTION

1. Field of the Invention

The present invention relates generally to an apparatus and method for generating light energy, and more particularly, to passively modelocked lasers having the emission wavelength controlled by balancing non-linear effects.

2. State of the Art

Practically speaking, ultra-short pulse sources which can consistently emit pulses having pulse durations less than one picosecond should be compact, environmentally stable and require relatively low power. A document entitled "Additive-Pulse-Compression Modelocking of a Neodymium Fiber Laser", by Fermann M. E. et al, Optics Letters, Vol. 16, No. 4, Feb. 15, 1991, pages 244–246, describes a passively modelocked fiber laser for generating ultra-short pulses using a rare-earth doped fiber.

An environmentally stable, passively modelocked laser is described in co-pending U.S. application Ser. No. 08/169,707 entitled "Environmentally Stable Passively Modelocked Fiber Laser Pulse Source", filed in the U.S. Patent and Trademark Office on Dec. 20, 1993, by Dr. Martin E. Fermann and Dr. Donald J. Hatter, the disclosure of which is hereby incorporated by reference in its entirety. As referenced therein, the phrase "environmentally stable" refers to a pulse source which is substantially immune to a loss of pulse generation due to environmental influences such as temperature drifts and which is, at most, only slightly sensitive to pressure variations.

Exemplary embodiments of an environmentally stable, ultra-short pulse source have been implemented by differentially exciting two linearly polarized, fundamental eigenmodes of a highly birefringent fiber (HBF) such that they accumulate a differential non-linear phase delay after a particular propagation distance. Due to interference of the eigenmodes at a polarizer, the non-linear phase delay translates into an amplitude modulation, which can provide sufficient pulse-shortening per round-trip to produce stable passive modelocking. The amount of amplitude modulation is sensitive to the linear phase delay between the two interfering eigenmodes.

Linear phase drifts between two polarization eigenmodes of a cavity, such as the cavity described in accordance with exemplary embodiments of the previously mentioned co-pending application, can be eliminated using a pigtailed Faraday rotator mirror (FRM) as one of the cavity mirrors. A document entitled "Single-Polarisation Fibre Amplifier", by I. N. Duling III et al, Electronics Letters, Jun. 4, 1992, Vol. 28, No. 12, pages 1126–1128 also generally describes using a Faraday rotator mirror a as an end mirror. The Faraday rotator mirror permits environmental stability to the amplifier.

Passively modelocked lasers are typically subject to a variety of processes that affect the output pulses. For example, in a document entitled "Mode Locking In Solitary Lasers", by T. Brabec et al, Optics Letters, Vol. 16, No. 24, Dec. 15, 1991, pages 1961–1963, pulse formation in modelocked lasers is described wherein the presence of isolated (i.e., discrete) cavity elements results in the occurrence of instability. Noticeable affects on stability can also result from third-order dispersion, and such instabilities can result in the formation of spectral sidebands as described, for example, in a document entitled "Characteristic Sideband Instability of the Periodically Amplified Average Soliton", by S. M. J. Kelly, Electronics Letters, Vol. 28, page 806, 1992. Further, in a document entitled "Ultrabroad-Band Femtosecond Lasers", by Christian Spielmann et al, Journal of Quantum Electronics, instabilities due to third-order dispersion which give rise to asymmetric pulse spectra are described.

Thus, while conventional passively modelocked lasers are typically subject to processes which can result in instabilities that affect the output pulses (e.g., emission wavelength), any gain-pulling due to these instabilities is minimal such that the spectrum of the modelocked pulses remains located close to the peak of the gain profile. In particular, the tuning range of standard modelocked lasers is governed dominantly by their finite gain bandwidth and cannot be extended or controlled by non-linear processes.

Because the tuning range of standard modelocked lasers is primarily governed by their finite gain bandwidth, any ability to control selection of a particular emission wavelength of the modelocked laser is substantially limited. Accordingly, it would be desirable to provide a tunable laser having an emission wavelength which can be controlled over a relatively broad bandwidth.

SUMMARY OF THE INVENTION

The present invention is generally directed to a laser, such as a soliton fiber laser, having an emission wavelength controlled by non-linear effects. Although the emission wavelength of such lasers is typically limited to the center of the gain profile, exemplary embodiments of the present invention provide relatively broad bandwidth control by producing significant gain-pulling using non-linear effects. Any non-linear effects in a laser cavity can be used to provide significant gain pulling and a broadband wavelength tuning range including, for example, the soliton self-frequency shift (SSFS) and cross-phase modulation (CPM). As a result, non-linear tuning can be achieved. Exemplary embodiments provide gain-pulling which allows a significant separation to be induced between the peak emission wavelength of the modelocked fiber laser (i.e., the modelocked emission wavelength, or MLEW) and the emission wavelength of the non-modelocked laser (i.e., the continuous wave emission wavelength, or CWEW).

Exemplary embodiments of the present invention include a cavity having an axis along which light energy travels, a medium having a non-linear refractive index for inducing a predetermined wavelength shift of a modelocked emission wavelength of the cavity relative to a continuous wave emission of the cavity, and means for outputting energy generated within the cavity.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 1:
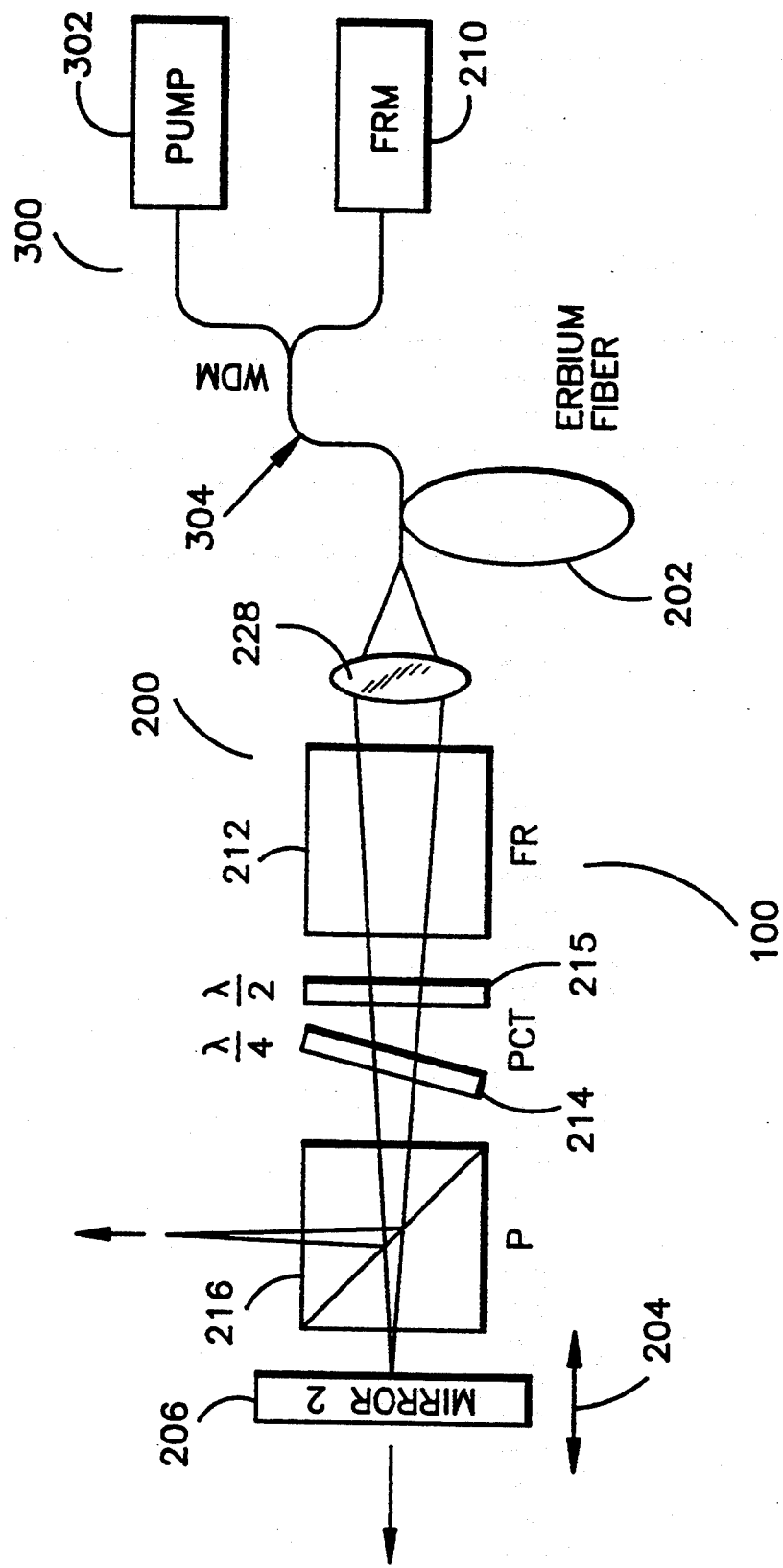
FIG. 1 shows an exemplary embodiment of an environmentally stable Kerr-type modelocked fiber laser.

FIG. 1 illustrates an apparatus for amplifying light energy, represented as a laser energy generating means, such as a passively modelocked soliton fiber laser 100. As illustrated in the FIG. 1 embodiment, the passively modelocked laser 100 includes a cavity 200 having an axis along which light energy travels. In accordance with exemplary embodiments, the cavity can be a Fabry-Perot cavity as illustrated in FIG. 1.

The passively modelocked laser further includes a means for pumping the laser energy generating means, the pumping means being generally designated 300. The pumping means includes an energy source (e.g., electrical or optical energy source, depending on laser type) generally represented as a pump 302. A wavelength-division multiplexing coupler (WDM) 304 formed using low birefringent fiber is provided for coupling the pumping means to the cavity 200. In an exemplary embodiment, the pump 302 can produce energy in the 980 nanometer range, and the wavelength division multiplexer coupler can be an Aster WDM 1550/980 to accommodate a 980 nanometer pump and a 1550 nanometer signal. However, those skilled in the art will appreciate that the wavelength division multiplexing coupler can be any multiplexer which allows pumping of the laser cavity 200 without substantial loss of signal light; i.e., one which allows differential coupling between the pump 302 and the signal light.

In the FIG. 1 embodiment, the cavity includes a gain medium 202 for amplifying energy within the cavity 200. The gain medium can be any rare-earth-doped fiber capable of providing light amplification. For purposes of the following discussion, reference will be made to an optically pumped laser having an active fiber doped with erbium ions as the gain medium 202. However, those skilled in the art will appreciate that other rare-earth-doped fibers, such as fibers doped with neodymium ions can be used. Further, the present invention is not limited to fiber lasers, but can also be used with other types of lasers such as bulk solid-state lasers comprising a gain medium of bulk solid-state materials, and semiconductor lasers. Optical or electrical pumping can be used, although optical pumping is generally preferred for use with bulk solid-state lasers while electrical pumping is generally preferred for semiconductor lasers.

In accordance with the present invention, the gain medium amplifies energy along the axis of the cavity and can be a medium having a non-linear refractive index. Alternately, a medium having a non-linear refractive index, separate from the gain medium, can be provided. The use of a medium having a non-linear refractive index induces a predetermined wavelength shift of a modelocked emission wavelength of the cavity relative to a continuous wave emission wavelength of the cavity.

The continuous wave emission wavelength of the laser 100 is located at the peak of the spectral gain band. The location of the modelocked emission wavelength can be shifted by up to, for example, 14 nanometers (i.e., by nearly 30 percent of the gain bandwidth of erbium) away from the continuous wave emission wavelength of the laser 100. The location to which the modelocked emission wavelength is shifted is power dependent and can be suppressed by the selection of a suitable polarization state inside the fiber.

The laser cavity 200 further includes means for reflecting energy along an axis within the cavity which passes through the gain medium, the axis being generally designated by the arrow 204. The energy reflecting means includes a first cavity mirror 206, located at a first end of the cavity 200, for reflecting signal light within the cavity. The cavity mirror can be any standard laser mirror readily available and known to those skilled in the art. In the exemplary FIG. 1 embodiment, the cavity mirror 206 also functions as a laser energy outputting means for outputting energy generated within the cavity. Thus, the cavity mirror 206 in the FIG. 1 embodiment serves two functions: it reflects a fraction of energy impinging onto it back into the laser cavity 200; and, it allows the remaining fraction of energy to leak through the cavity mirror 206 to provide output energy. Alternately, the first cavity mirror 206 can be separate from an output coupler means if desired.

The FIG. 1 embodiment includes two interfering polarization directions of a Kerr-type modelocked fiber laser. These interfering polarization directions include two linearly polarized eigenmodes of a highly-birefringent fiber (HBF). In the exemplary FIG. 1 embodiment, the erbium-doped fiber used as the gain medium 202 can be a highly-birefringent fiber.

In accordance with the present invention, the FIG. 1 cavity 200 can also include low-birefringent fiber (LBF). In exemplary embodiment, the length of low-birefringent fiber can be relatively short in comparison to the length of the highly-birefringent fiber (e.g., on the order of eight to ten times shorter). The highly-birefringent fiber thereby dominates non-linear pulse-shaping in these embodiments, with such pulse shaping being negligible in the low-birefringent fiber.

In an exemplary implementation of a cavity, 2.6 meters of highly-birefringent fiber can be used with 0.6 meters of standard communications-type low-birefringent fiber. The highly-birefringent fiber can have a polarization beat length of 10 centimeters at a lasing wavelength of 1.567 microns, an effective core area of 28 microns and a numerical aperture of 0.19. Further, the highly-birefringent fiber can be doped with, for example, approximately $5 \times 10^{18}$ erbium ions/centimeters$^3$.

By using both high-birefringent fiber and low-birefringent fiber in the cavity, non-polarization maintaining couplers can be used for coupling light into and out of the laser cavity 200 to simplify laser assembly and packaging and thus reduce overall costs. Alternately, the cavity can include only low birefringement fiber where short-pulse oscillation is induced by a saturable absorber. Equally, fibers sections with both positive and negative group velocity dispersion (GVD) can be included in the cavity.

In accordance with exemplary embodiments, the laser cavity 200 can further include means for compensating linear phase drifts of the gain medium 202. For example, a phase drift compensating means can be provided to control polarized light generated within the cavity using at least one Faraday rotator, such as a pigtailed Faraday rotator mirror 210 formed with low birefringent fiber. Faraday rotator mirrors are known devices which can be chosen to reflect, in an orthogonal state, any polarization state which impinges upon them. The at least one Faraday rotator mirror can therefore compensate for linear phase drifts between the polarization eigenmodes of the gain medium. The reflective qualities of the pigtailed Faraday rotator mirror 210 permit this device to serve as a second cavity mirror of the reflecting means located at a second end of the cavity 200, opposite the first end, thereby defining the boundaries of the cavity 200. For example, the Faraday rotator mirror 210 can be a 45 degree rotator which rotates the polarization of reflected light by 90 degrees relative to incoming light such that reflected light propagates back down the gain medium 202 in exactly an orthogonal polarization state.

Due to the use of the Faraday rotator mirror 210, the total linear phase delay between the polarization eigenmodes of the fiber is exactly zero after one round-trip. Non-linear phase changes remain uncompensated and accumulate along the polarization eigenmodes of the highly-birefringent fiber after reflection by the Faraday rotator mirror 210. Because the highly-birefringent fiber eliminates random mode-coupling, and because the low-birefringent fiber is relatively short in length, the non-linear phase changes are governed by the relative power in the polarization eigenmodes and are not susceptible to environmental influence. When low-birefringent fiber is used in conjunction with a saturable absorber in the cavity, short pulse oscillation is dominated by the saturable absorber, which reduces the differential phase delay between the polarization eigenmodes to a negligible level. Thus, the Faraday rotator still stabilizes the linear polarization state of the cavity.

The Faraday rotator mirror 210 suppresses spurious back-reflections from intra-cavity fiber ends (e.g., fiber, including the gain medium 202, included within cavity 200) and eliminates a possible continuous wavelasing background. For example, scattered light which is reflected back to the Faraday rotator mirror 210 will again be rotated therein and absorbed by an optical polarizing element, such as polarizer 216.

The Faraday rotator mirror 210 can be incorporated at a point in the laser cavity 200 at which group-velocity walk-off between the polarization eigenmodes is maximum. Thus, non-linearity of fiber components in front of the Faraday rotator mirror 210 along the cavity axis can be reduced to minimize unwanted non-linearity of the low-birefringent fiber. Thus, environmentally stable operation can be achieved using relatively long lengths of low-birefringent fiber, if desired.

The phase drift compensating means can further include a second Faraday rotator 212. The second Faraday rotator 212 can be a 45° Faraday rotator which, in an exemplary embodiment, can be centrally poised in the cavity to compensate for polarization rotation of the Faraday rotator mirror 210.

The exemplary FIG. 1 apparatus also includes means for focusing energy generated along the axis 204, with the energy focusing means including at least a first lens 228 for focusing energy received from the gain medium 202 onto the first cavity mirror 206, and for directing energy from the cavity mirror 206 onto the gain medium 202. A highly-birefringent fiber section can therefore extend from a location adjacent the lens 228, or as close to it as possible, to ensure that an amount of power in the polarization eigenmodes of the highly-birefringent fiber stays absolutely constant. In such an arrangement, the first Faraday rotator mirror 210, the wavelength division multiplexer coupler 304 and the highly birefringent fiber 218 can be interconnected using fusion splices.

The lens 228 can be any optical element available for focusing light from the gain medium. In exemplary embodiments, the focal point of the lens can be selected to coincide with the first cavity mirror 206 so that the power density on the cavity mirror 206 is maximized. Similarly, the focal point of the lens can be selected to coincide with maximizing power density on the gain medium 202.

Although the phase drift compensating means provides environmental stability, a means for transforming linear polarization of energy can be used to optimize non-linear polarization evolution for modelocking. The linear polarization transformation means can include one or more waveplates 214 and 215 within the laser cavity 200 for introducing a linear phase delay, with interference of polarization eigenmodes occurring at the polarizer 216.

In the exemplary FIG. 1 embodiment, the waveplates 214 and 215 are illustrated as a $\lambda/4$ waveplate and a $\lambda/2$ waveplate, respectively. The linear polarization transformation means provides a unique polarization transformation from the intra-cavity polarizer to the fiber. This transformation is defined on the well-known Poincaré sphere as $(0,0) \rightarrow (2\Psi, 2\alpha)$; that is, linearly polarized light emerging from the polarizer 216 is transformed into elliptically polarized light with an ellipticity $\Psi$ (representing the round-trip linear polarization state and the cavity loss), where the ellipse is rotated by an angle e with respect to x-axis of the fiber, and wherein the tangent of $\Psi$ is b/a where b and a are minor and major axes of the polarization ellipse, respectively.

In calculating the polarization transformation, the action of the intra-cavity Faraday rotator is ignored. The polarization state at the intra-cavity polarizer is (0,0) and the polarization at the fiber end closest to the polarizer 216 is $(2\Psi, 2\alpha)$, where $\alpha$ is the angle of the continuous wave polarization ellipse with respect to the slow axis of the fiber. Note that the continuous wave loss of the cavity is given by $\sin^2 2\Psi$.

Generally speaking, a physical meaning can be attached to the polarization transformation by assuming that the $\lambda/4$ waveplate is aligned with its axes at 45° with respect to the polarizer 216. By tilting the $\lambda/4$ waveplate, a phase delay of $\delta = 2\Psi$ is introduced along its axes.

Thus, the polarization transformation induced by the waveplates can be adjusted by holding $\Psi$ constant and by changing $\alpha$. This is performed by leaving the $\lambda/4$ waveplate untouched and rotating the $\lambda/2$ waveplate. The resulting action does not change the continuous wave loss in the cavity; i.e., the action leaves the linear (round-trip) polarization state of the cavity essentially unaffected.

On the other hand, changing $\alpha$ changes the power distribution in the fiber axes and will thus lead to a change in the non-linear polarization state of the cavity. Hence, using this particular control, the non-linear polarization state of the cavity can be separately changed without affecting the (round-trip) linear polarization in the cavity.

In accordance with exemplary embodiments, means for initiating a modelocking process in a cavity 200 can also be included using, for example, a saturable absorber, a vibrating cavity mirror, a fiber stretcher or an optical modulator. The modelocking process can be sustained in the cavity using the saturable absorber in conjunction with Kerr-type non-linearity of the cavity. The saturable-absorber can be a semiconductor material with its band edge close to the lasing wavelength of the fiber laser.

Those skilled in the art will appreciate that the laser system configuration of the FIG. 1 embodiment is by way of example only and that alternate embodiments can be used in accordance with the present invention. For example, the FIG. 1 system can be implemented using any type of fiber in the cavity. Further, the entire Fabry-Perot configuration of FIG. 1 can be reversed so that the Faraday rotator mirror 216 is to the lefthand side of the cavity and the cavity mirror 206 is to the righthand side of the cavity.

In accordance with the present invention, the exact locations of the Faraday rotator mirror 210 and the Faraday rotator 212 can be readily determined by those skilled in the art. However, in accordance with exemplary embodiments, the Faraday rotator mirror 210 and the Faraday rotator 212 define an intra-cavity portion of the cavity 200 wherein the gain medium is located.

Further, those skilled in the art will appreciate that the selection and location of non-polarization maintaining, low-birefringent fiber can vary widely to satisfy the design constraints of a particular implementation. Further, in accordance with exemplary embodiments, highly-birefringent fiber can be used for the entire cavity.

In accordance with another exemplary embodiment, a 2.3 meter length of such fiber can be doped with approximately $5 \times 10^{18}$ erbium ions/centimeter$^3$. In this case, the core diameter can be 5 microns, the polarization beat length 10 centimeters and the group-velocity dispersion a negative 13,000 femtoseconds$^2$/meter. For such an embodiment, an exemplary stability range can be defined as follows:

55 degrees $<\Psi<77°$
9 degrees $<\alpha<32$ degrees

Thus, modelocking can be sustained for a continuous wave intra-cavity loss between 20 and 90 percent. Modelocking can be initiated in about 30 percent of the stability range or greater where modelocking was initiated by either vibrating one of the cavity end mirrors or by using a saturable absorber inside the cavity. In exemplary embodiments, pulse widths inside the stability range can be varied over a range of between 200 and 400 femtoseconds or greater, while sustaining a range of intra-cavity pulse energies of between 50 and 150 pico-Joules or greater. When keeping the polarization transforming means fixed, stable modelocking without a continuous wave background can be obtained for pump power variations of up to ±20 percent or greater.

Figure 2A:
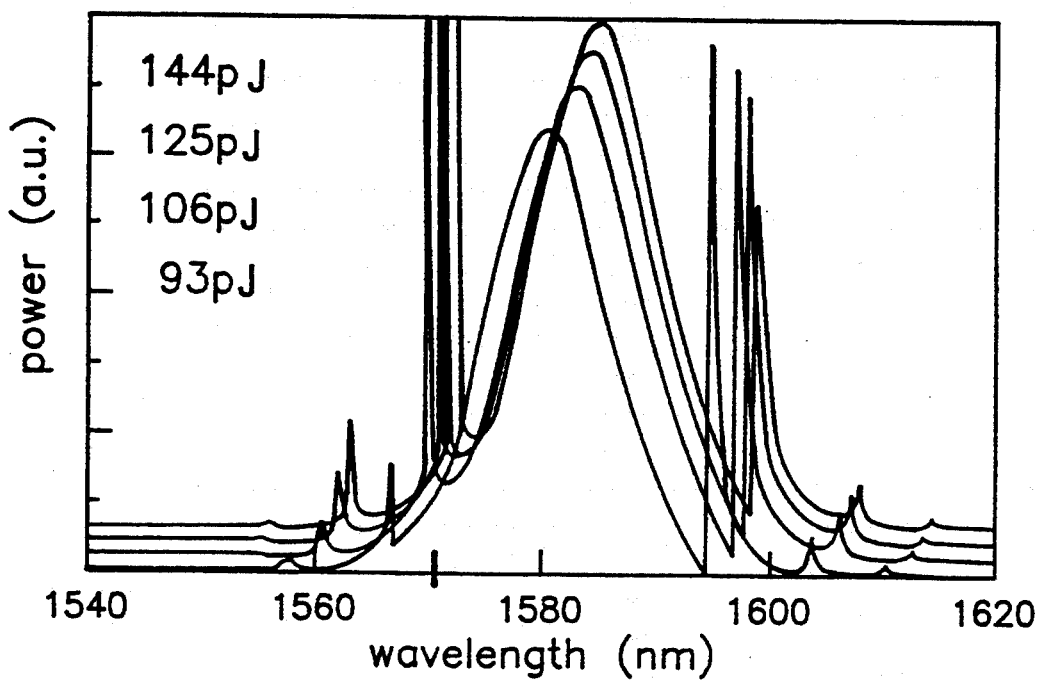
FIGS. 2A and 2B illustrate pulse spectra as a function of increasing intra-cavity pulse energy in the presence of (a) uncompensated and (b) compensated gain-pulling.
Figure 2B:
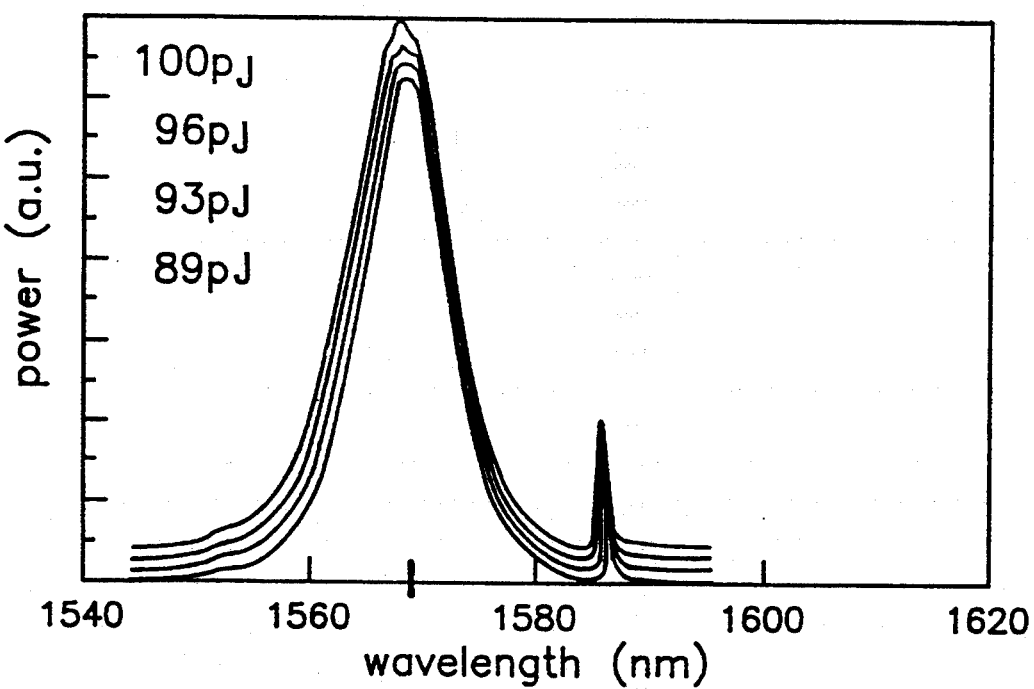
Figure 3:
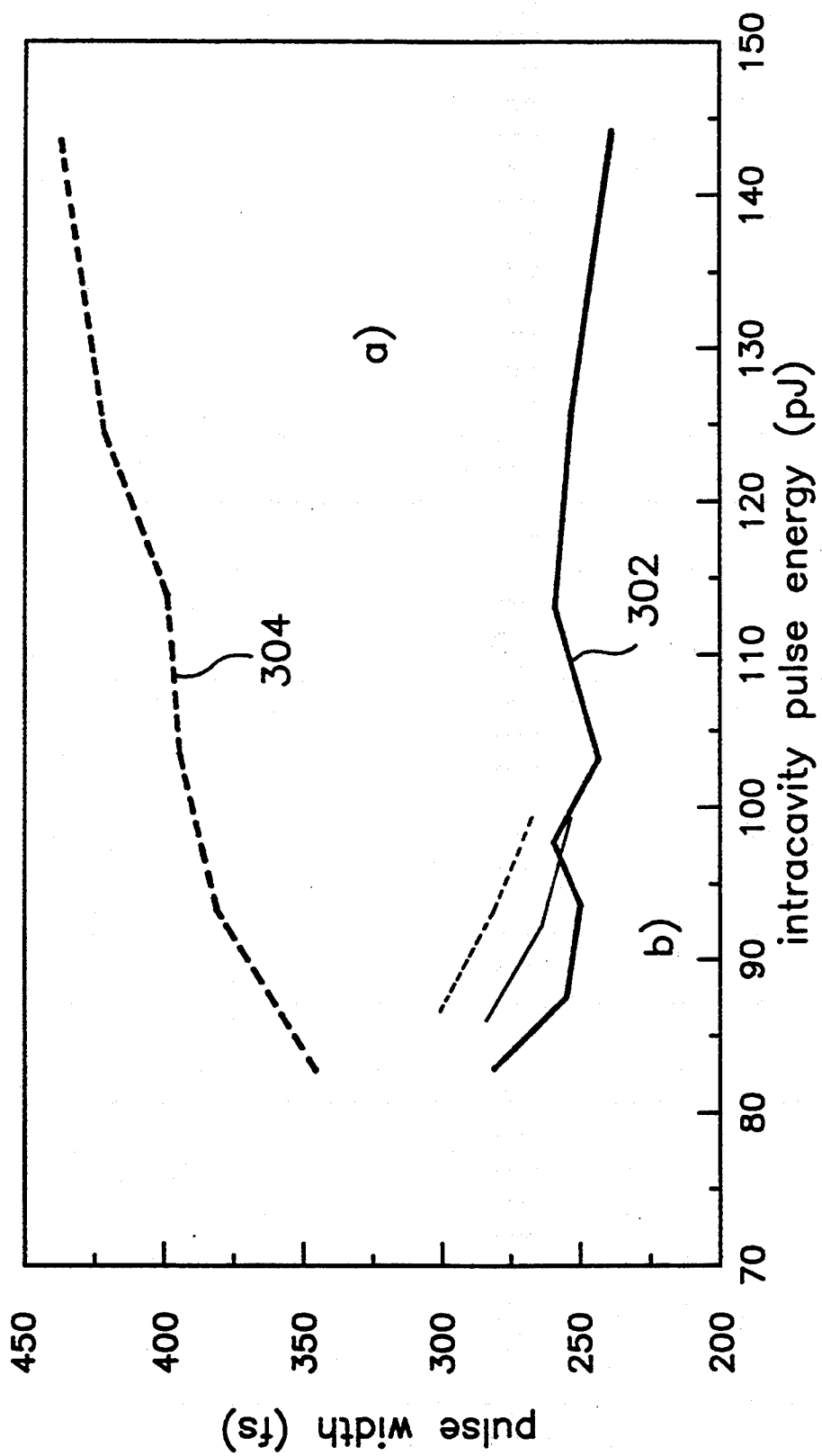
FIG. 3 illustrates pulse widths as a function of intracavity pulse energy, with the solid line representing a parallel measurement and with the dotted line representing an orthogonal measurement relative to the intracavity polarizer.

The pulse spectra as a function of increasing intra-cavity pulse energy in the presence of uncompensated gain-pulling and in the presence of compensated gain-pulling are illustrated in FIGS. 2A and 2B. FIG. 3 illustrates pulse widths as a function of intra-cavity pulse energy. The FIG. 3 pulse spectra can be obtained with the polarization transforming means set at $\alpha=10$ degrees, whereas $\Psi=75$ degrees and 57 degrees for FIG. 2A and FIG. 2B, respectively°

In FIG. 3, the solid line 302 represents a parallel measurement relative to the intra-cavity polarizer 216 of FIG. 1. The dotted line 304 of FIG. 3 represents an orthogonal measurement of the pulse widths representing an orthogonal measurement relative to the intra-cavity polarizer 216 of FIG. 1.

The pulse spectrum in FIG. 2A exhibits a large power-dependent wavelength shift, which can extend up to 14 nanometers to the red side of the peak of the gain profile (as represented by the marked position of the continuous wave emission near 1570 nanometers). Note that for red-shifts larger than 10 nanometers, a continuous wave instability arises at the spectral gain peak. The continuous wave instability occurs near the continuous wave emission wavelength and thus the large red-shift becomes even more apparent. The red-shift allows the tuning range of the fiber laser to be extended. Further the red-shift allows the separation of the continuous wave emission wavelength from the modelocked emission wavelength described previously.

On the other hand, in FIG. 2B the position of the pulse spectrum is nearly power-independent and located close to the spectral gain peak. A significant difference between the FIG. 2A spectrum and the FIG. 2B spectrum is the intra-cavity loss, which is 25 percent and 83 percent in FIGS. 2A and 2B, respectively. As the intra-cavity loss is increased, the pulling force from the gain profile also increases and tends to center the pulse near the peak of the gain profile.

By keeping $\Psi$, the round-trip linear polarization state and the cavity loss constant, and by varying $\alpha$, large spectral red-shifts can be obtained for large values of $\alpha$, which maximize the intra-cavity pulse energy and minimize the pulse width. In particular, by simply rotating the $\lambda/2$ waveplate of the polarization transforming means, wavelength tuning of the fiber laser can be achieved with a single control.

Large red-shifts can be attributed primarily to the soliton self-frequency shift and cross-phase modulation. The soliton self-frequency shift is well-known from soliton communications and can lead to red-shifts in soliton transmission. Frequency shifts from cross-phase modulation are known from studies of so-called vector solitons; i.e., the propagation of soliton in birefringent fibers. In accordance with the present invention, gain-pulling can be used to broaden the tuning range of fiber lasers whenever any linear or non-linear effects are present in the fiber cavity that can lead to a large separation between the continuous wave emission wavelength and the modelocked emission wavelength.

The correct magnitude of the red-shift expected from both the soliton self-frequency shift and cross-phase modulation can be simulated numerically, as can the onset of continuous wave instability for large red-shifts. For the numerical simulations, the well-known non-linear Schrodinger equation can be solved by a split-step Fourier transform method. To model the laser correctly, two coupled non-linear Schrodinger equations, with a cross-phase modulation and a group-velocity walk-off term to account for the two axes of the fiber, can be used with a time-delayed non-linear response (accounting for the soliton self-frequency shift). Further, gain and periodic loss in the cavity, along with a term accounting for any assumed parabolic gain profile of the erbium fiber can be incorporated into the numerical simulation.

In contrast to the soliton self-frequency shift, the cross phase modulation can also lead to spectral blue-shifts depending on the exact setting of $\Psi$ and $\alpha$ in the polarization transforming means. FIG. 2B reveals that the pulse spectrum exhibits a small blue shift with an increase in pulse power, which indicates that in this case the pulling force from cross-phase modulation opposes Raman self-scattering. In fact the polarization transforming means can be adjusted to give blue-shifts as large as 2 nanometers. In particular, gain-pulling from one or more effects in the cavity can be compensated by one or more other effects in that cavity. Those skilled in the art will appreciate that by compensating sufficiently strong gain-pulling from one or more effects in the cavity with gain-pulling from other equally strong effects, a continuous wave emission wavelength will move closer to the modelocked emission wavelength. A balance of non-linear effects in the cavity can therefore be used to control gain-pulling, and thereby provide the broadband emission wavelength control which can be achieved in accordance with exemplary embodiments.

Thus, gain-pulling can be used to broaden the tuning range of a passively modelocked fiber laser. Further, the control of the (round-trip) linear polarization state of a fiber laser cavity can be separated from the control of the non-linear polarization state of the cavity, such that gain-pulling can be used to separate the continuous wave emission wavelength from the modelocked emission wavelength. This separation can be used to improve the quality of modelocked pulses, and can be achieved by setting the polarization transforming means to give a large separation and by allowing a small amount of continuous wave emission to be present simultaneously with the modelocked pulses. By filtering out the continuous wave component, amplified spontaneous emission in the cavity can be reduced, and/or the noise of the modelocked pulses can be reduced. The continuous wave emission wavelength can be removed by optical filtering techniques.

Those skilled in the art will appreciate that the gain-pulling described in accordance with exemplary embodiments of the present invention can be used with lasers other than those described above including, but not limited to, any modelocked fiber laser, semiconductor lasers, or any other waveguide or bulk laser. Further, those skilled in the art will recognize that whenever gain-pulling manifests itself in a separation of the continuous wave emission wavelength from the modelocked emission wavelength, the continuous wave emission wavelength can be filtered out using an optical filter, thus permitting such features as laser and amplified spontaneous emission noise suppression.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for amplifying light energy comprising:
   a cavity having an axis along which light energy travels;
   means for transforming polarization of light energy in said cavity;
   a medium for receiving said light energy and having a non-linear refractive index selected to induce a predetermined wavelength shift of a modelocked emission wavelength of the cavity relative to a continuous wave emission wavelength of the cavity in response to control of said polarization transforming means; and
   means for outputting light energy from said cavity.

2. Apparatus according to claim 1, wherein said medium is a gain medium for amplifying energy along said axis of the cavity.

3. Apparatus according to claim 1, further including:
   an additional gain medium for amplifying energy along said axis of the cavity.

4. Apparatus according to claim 1, further comprising:
   means for compensating linear phase drifts of the gain medium by controlling polarized light generated within said cavity using at least a first Faraday rotator and a second Faraday rotator, said first and second Faraday rotators being located within said cavity to define an intra-cavity region.

5. Apparatus according to claim 4, wherein at least one of said first and second Faraday rotators further includes:
   an output coupler of said energy outputting means.

6. Apparatus according to claim 1, further including:
   means for reflecting said light energy along said axis within the cavity, said energy reflecting means including a first cavity mirror located at a first end of said cavity, and a second cavity mirror located at a second end of said cavity opposite said first end, said second cavity mirror further including a Faraday rotator.

7. Apparatus according to claim 1, wherein said polarization transforming means further includes:
   at least one waveplate located along said axis for changing a polarization state of said cavity.

8. Apparatus according to claim 7, wherein said polarization transforming means further includes:
   at least first and second waveplates located along said axis, said first waveplate introducing a first linear phase delay and said second waveplate introducing a second linear phase delay, with said first linear phase delay having a value different from said second linear phase delay.

9. Apparatus according to claim 1, wherein said cavity further includes:
   means for focusing energy generated along said axis within said cavity.

10. Apparatus according to claim 1, wherein said energy outputting means further includes:
    an output coupler for emitting energy from said cavity.

11. Apparatus according to claim 1, further comprising:
    means for pumping said energy generating means using an energy source and a wavelength-division multiplexing coupler for coupling said pumping means to said cavity.

12. Apparatus according to claim 1, wherein said medium includes:
    a rare-earth doped fiber having a non-linear refractive index.

13. Apparatus according to claim 1, further including:
    means for initiating a modelocking process in the cavity using at least one of a saturable absorber, a vibrating cavity mirror, a fiber stretcher or an optical modulator.

14. Apparatus according to claim 1, wherein said cavity possesses Kerr-type non-linearity, said apparatus further including:
    means for sustaining a modelocking process in the cavity using a saturable absorber in conjunction with said Kerr-type non-linearity of the cavity.

15. Apparatus for amplifying light energy comprising:
a cavity having an axis along which light energy travels;
means for transforming polarization of energy in said cavity using at least one waveplate; and
a medium for receiving said light energy, at least a portion of said medium having a non-linear refractive index selected to induce a predetermined wavelength shift of a modelocked emission wavelength of the cavity relative to a continuous wave emission wavelength of the cavity in response to control of said polarization transforming means.

16. Apparatus according to claim 15, further including:
an additional gain medium for amplifying energy along said axis of the cavity; and
a first Faraday rotator and a second Faraday rotator for compensating linear phase drifts, said first and second Faraday rotators being located within said cavity to define an intra-cavity fiber region of the cavity.

17. Apparatus according to claim 15, further including:
a first cavity mirror located at a first end of said cavity; and
a second cavity mirror located at a second end of said cavity opposite said first end.

18. Apparatus according to claim 15, wherein said cavity further includes:
an optical filter for filtering said continuous wave emission wavelength from an output of said cavity.

19. Apparatus according to claim 15, wherein said polarization transforming means further includes:
at least first and second waveplates located along said axis, said first waveplate introducing a first linear phase delay and said second waveplate introducing a second linear phase delay, with said first linear phase delay having a value different from said second linear phase delay.

20. Apparatus according to claim 15, wherein said cavity further includes:
means for focusing energy generated along said axis within said cavity.

21. Apparatus according to claim 15, wherein said energy outputting means further includes:
an output coupler for emitting energy from said cavity.

22. Method for amplifying light energy comprising the steps of:
supplying energy to a laser cavity;
amplifying said energy by using a medium having a non-linear refractive index which is selected to induce a predetermined wavelength shift of a modelocked emission wavelength relative to a continuous wave emission wavelength in the laser cavity; and
controlling said predetermined wavelength shift by transforming polarization of energy in the cavity using at least one waveplate.

23. Method according to claim 22, further including the step of:
filtering the continuous wave emission wavelength from energy output from said cavity.

24. Method according to claim 22, further including the step of:
rotating said at least one waveplate to change a non-linear polarization state of said cavity.

* * * * *